May 5, 1936.  L. W. HAAS  2,039,313
APPARATUS FOR PROTECTING SLICED BREAD AGAINST MOLD
Original Filed Aug. 17, 1931  2 Sheets-Sheet 1
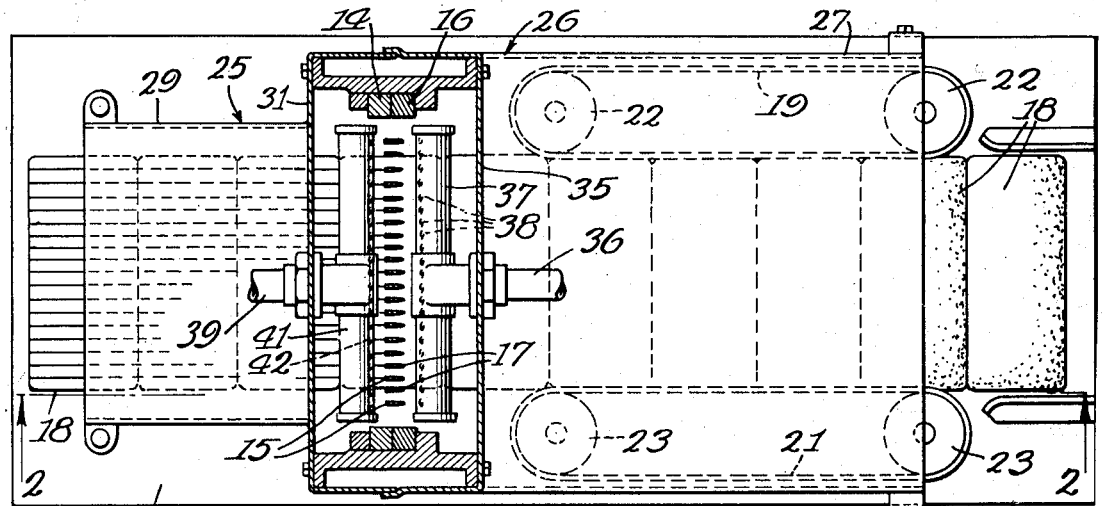
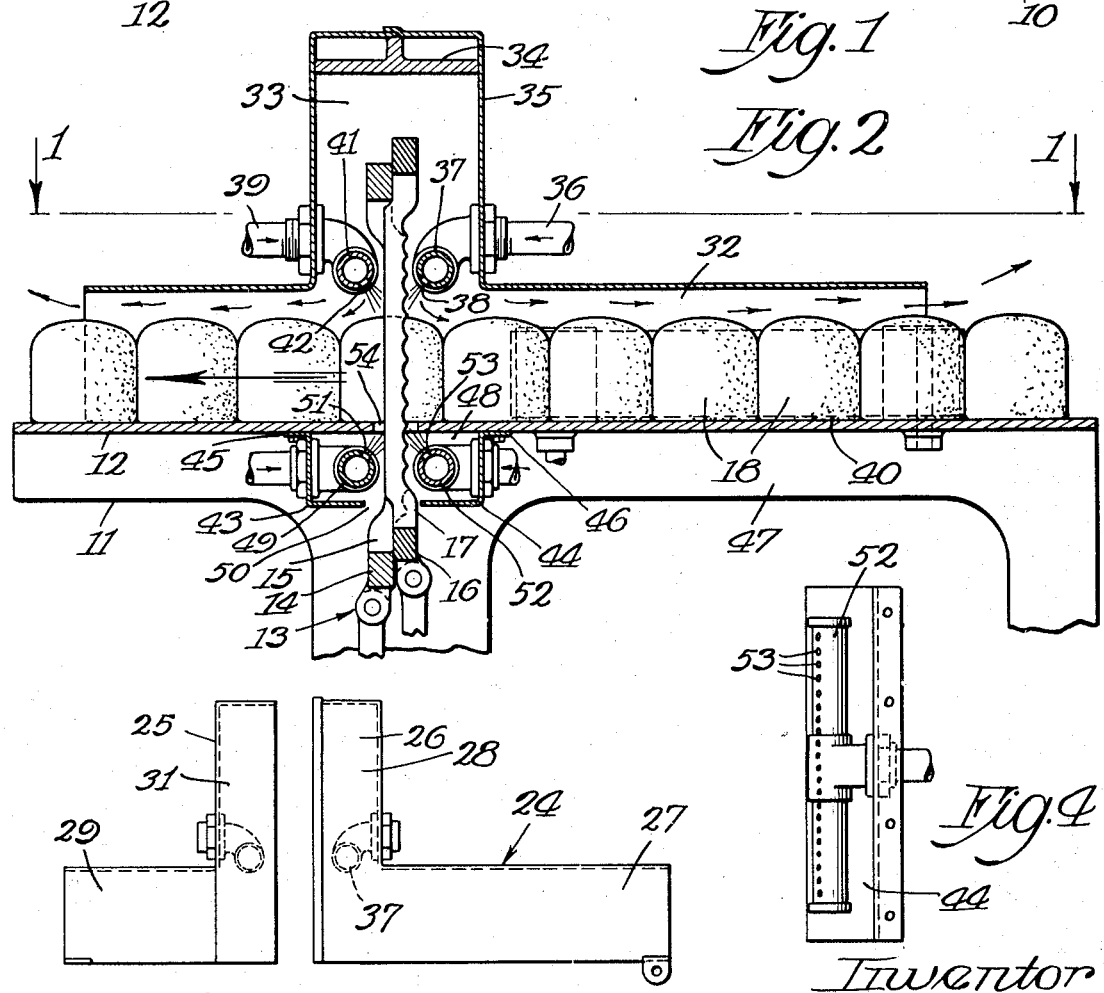
Fig. 1
Fig. 2
Fig. 3
Fig. 4
Inventor
Louis W. Haas
By Gillson Mann Leo Attys.

May 5, 1936.  L. W. HAAS  2,039,313
APPARATUS FOR PROTECTING SLICED BREAD AGAINST MOLD
Original Filed Aug. 17, 1931  2 Sheets-Sheet 2
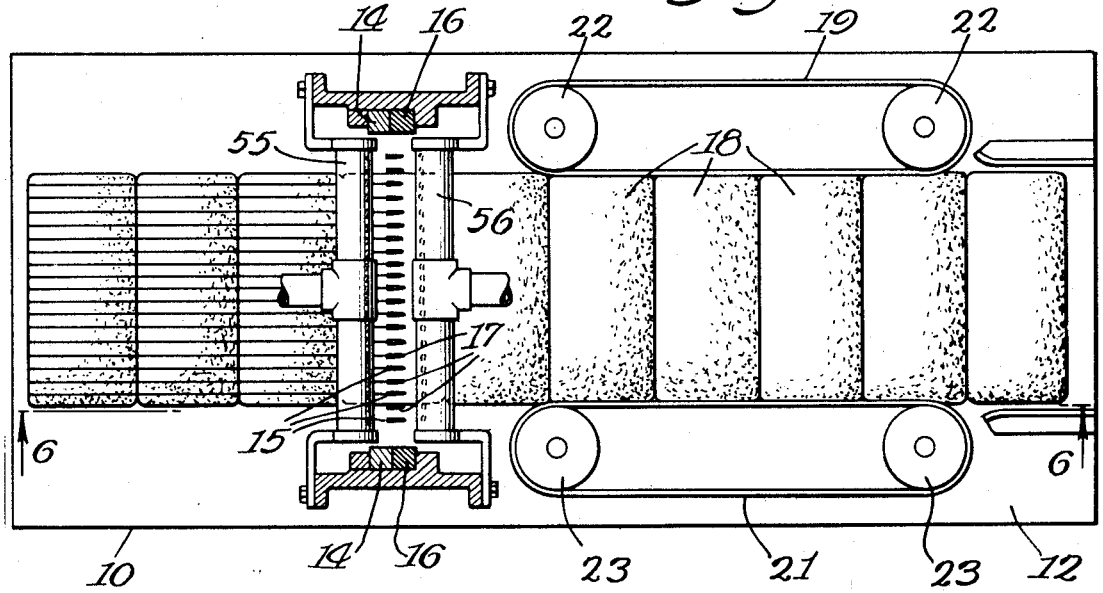
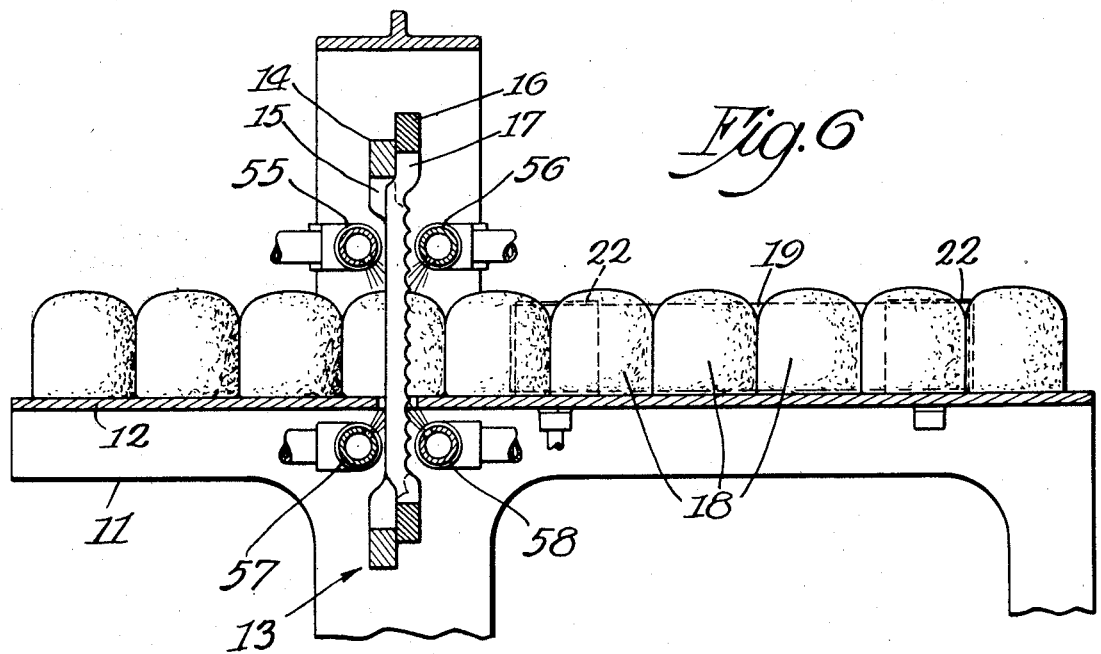
Inventor
Louis W. Haas
By Gillson, Mann ... Attys.

Patented May 5, 1936

2,039,313

UNITED STATES PATENT OFFICE 2,039,313

APPARATUS FOR PROTECTING SLICED BREAD AGAINST MOLD

Louis W. Haas, Chicago, Ill., assignor to The W. E. Long Co., a corporation of Illinois Application August 17, 1931, Serial No. 557,541
Renewed July 24, 1935

3 Claims. (Cl. 99—234)

This invention relates to bakery equipment, and more particularly to mechanism for sterilizing the blades of bread slicing machinery.

The principal object of the invention is the provision of new and improved means for protecting the surfaces of freshly sliced bread from mold contamination during the slicing operation.

Another object of the invention is the provision of a new and improved sterilizing attachment for bread slicing machines.

A further object of the invention is the provision of new and improved means for treating the loaves prior to and during the slicing operation for preventing mold spores from contaminating the surfaces of the sliced bread.

A still further object of the invention is the provision of new and improved means for preventing mold spores from contaminating the surfaces of freshly sliced bread, that is simple in construction, inexpensive to manufacture, that may be installed at a minimum of expense, and that is efficient in operation.

Other and further objects and advantages of the invention will appear from the following description taken in connection with the accompanying drawings, in which Fig. 1 is a plan view of a bread slicing machine shown more or less diagrammatically with portions of the same taken on line 1—1 of Fig. 2;

Fig. 2 is a vertical section on the broken line 2—2 of Fig. 1;

Fig. 3 is a side elevation of one of the attachments shown detached from the machine and the sections detached from each other;

Fig. 4 is a plan view of one of the nozzles, with parts broken away;

Fig. 5 is a view similar to Fig. 1, showing a modified form of the device; and

Fig. 6 is a vertical section on line 6—6 of Fig. 5.

It is common practice to slice freshly baked bread prior to its delivery to the trade. The slicing machine is usually in an open room and the bread is exposed prior to and during the slicing operation. The movement of the knives through the bread will cause mold spores, ever present in the air, to be carried by the blades and the air entering the incision, and to be deposited on the surfaces of the freshly sliced bread, and since the warmth and moisture of the interior of the loaf is conducive to the rapid growth of mold spores, the bread will soon become so contaminated as to be unfit for human consumption.

The object of the present invention is to remedy this defect in the present slicing machines by the provision of new and improved mechanism for preventing this mold spore contamination. The mechanism employed for this purpose will vary in design for different types of bread slicing machines, but in all cases means are provided for treating the slicing mechanism with sterilized air during the slicing operation.

For convenience of illustration and description the invention will be disclosed as applied to a slicing machine of the reciprocating blade type, but this is by way of example only as it is equally as applicable to other types of bread slicing machinery.

Referring now to the drawings, the reference character 10 designates a conventional bread slicing machine having the base 11, top 12 and slicing mechanism 13. The slicing mechanism comprises the frame 14 in which is mounted a plurality of vertically arranged blades 15 and a frame 16 in which is mounted a plurality of blades 17.

The blades 15 and 17 are arranged alternately across the machine and the frames 14 and 16 are reciprocated vertically in opposite directions. The blades 15 and 17 are separated from each other a sufficient distance to cut the bread into slices of the required thickness.

Suitable means are provided for advancing the loaves of bread 18 along the surface of the top 12 past the knives 15 and 17 so that they may be sliced as they pass the knives. In the form of construction shown, two endless belts 19 and 21 extending around rollers 22 and 23 respectively, are employed for this purpose.

The structure thus far described is a conventional type of bread slicing machine and the details thereof constitute no part of the present invention.

Suitable means are provided for causing the bread slicing members to operate in an atmosphere of sterilized air whereby the air entrained by the reciprocation of these members as well as the air adhering to the same will be sterilized, thus preventing mold spores from coming in contact with the surfaces of the freshly sliced bread during the slicing operation. Any suitable mechanism may be employed for this purpose. As shown, an attachment designated generally by the reference character 24 is employed for this purpose. The attachment comprises a casing composed of the sections 25 and 26 which are adapted to be secured to the slicing machine.

As shown, the section 26 comprises a body portion 27 and an upwardly extending portion 28, both of which are channel shape in cross section. The body portion 27 is open at its rear end and the upwardly extending portion 28 is closed at its upper end.

The section 26 comprises a body portion 29 and an upwardly extending portion 31 both of which are also channel shape in cross section, the body portion 29 being open at its forward end and the portion 31 being closed at its upper end. The parts are so constructed that when they are attached to the machine they will form with the top member 12 a channel 32 through which the bread is adapted to be conveyed, as clearly shown in Figs. 1 and 2 of the drawings. They also form a chamber 33 which extends about the support 34 for the upper portion of the slicing mechanism.

The front wall 35 of the upwardly extending portion 28 is provided with an opening in which is secured a pipe 36 which is adapted to deliver air to a nozzle or header 37 located within the chamber 33. The nozzle or header 37 is provided with a plurality of openings 38 directed forwardly and downwardly so that air discharged from the same will be directed on to the sides and backs of the blades 17.

The upwardly extending portion 31 has attached to it also a similar pipe 39 which is connected to a header or nozzle 41 located within the chamber 33 and provided with a plurality of openings 42 directed downwardly and rearwardly against the sides and backs of the blades 15.

These headers or nozzles extend substantially the full width of the bread conveyor or passage 40 along which the bread is conducted. Air discharged into the partially confined space about the slicing members escapes along the bread in both directions toward the front and rear of the passage along which the bread is conducted.

Means are also provided for partially enclosing the portion of the slicing members operating beneath the table and for supplying sterilized air to the enclosure. In the form of the construction shown, a pair of casing members 43 and 44 are employed for forming the partial enclosure. These members are attached as at 45 and 46 to the lower portion of the top 12 and extend downwardly and then inwardly toward the knives, their inner edges being separated a sufficient distance to permit the operation of the slicing members. These members extend substantially the full width of the table or frame 11 so that the depending flanges 47 at each side of the table or frame constitute an enclosure for the casing members.

The casing members and the flanges 47 form a partial enclosure 48 into which sterilized air is discharged. The casing member 43 carries a nozzle 49 having nozzle openings 51 which are directed inwardly and upwardly against the slicing members 15 and 17. The casing section 44 is also provided with a similar nozzle 52 which has a plurality of openings 53, see Fig. 4, for directing sterilized air upwardly and inwardly against the slicing members 15 and 17. The headers or nozzles 49 and 52 extend substantially the full width of the slicing mechanism and are substantially co-extensive with the upper headers or nozzles 37 and 41.

The slicing members 15 and 17 operate through slots 54 and the nozzles may, if desired, be so located as to direct the air upwardly and inwardly toward the slots against the slicing members.

The air is discharged through the space 50 between the casing members 43 and 44 through which the slicing members operate.

In the operation of the device, loaves of bread 18 are conducted in close formation along the passage 40 past the slicing members 15 and 17. The reciprocation of the members 15 and 17 will slice the loaves as they pass the same, and during their reciprocation sterilized air is delivered against the upper portion of these members by the nozzles 37 and 41 and against the lower portion by the nozzles 49 and 52. The casings surrounding the nozzles will confine the sterilized air, thereby insuring a sterilized atmosphere within which the slicing members operate.

The form of the construction shown in Figs. 5 and 6 differs from that already described in that no casings are provided for partially enclosing the nozzles 55, 56, 57 and 58. These nozzles may be arranged similar to the corresponding nozzles 41, 37, 49 and 52. Since the remainder of the structure is substantially the same as that previously described, it is not thought necessary to repeat the description.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. In a bread slicing machine, a plurality of movable bread slicing members, a conveyor for automatically supplying bread to said members, means above and below said conveyor for directing jets of sterilized air directly onto said members during their operation and means forming an elongated tunnel extending forwardly and rearwardly from said slicing members and enclosing the same and through which the bread is conducted.

2. An attachment for bread slicing machines comprising a casing, means for detachably attaching the same to said machine, and a plurality of nozzles carried by said casing for discharging sterilized air on the interior thereof, said casing having elongated top and side walls forming an extended tunnel through which loaves of bread are conducted during the slicing operation and having an upwardly extending portion forming a chamber having side, end and top walls for receiving the slicing mechanism when the attachment is secured in operative position on a slicing machine.

3. In a bread slicing machine, a supporting frame comprising a top member, means for moving loaves of bread longitudinally of said member, reciprocating knives for slicing said bread as it is moved along said member, said knives extending through said member, means including nozzles for directing jets of sterilized air onto said knives above said top member and means below said top member for directing jets of sterilized air onto said knives during the operation of said machine, said last named means comprising nozzles and means for enclosing said nozzles for confining the sterilized air through which the bread is adapted to pass during the slicing operation.

LOUIS W. HAAS.